(12) United States Patent
Morinaka et al.

(10) Patent No.: US 11,668,394 B2
(45) Date of Patent: Jun. 6, 2023

(54) PISTON AND RECIPROCATING COMPRESSOR

(71) Applicant: KOBE STEEL, LTD., Hyogo (JP)

(72) Inventors: Shunsuke Morinaka, Kobe (JP); Toru Okada, Kobe (JP); Tomohiro Otsuka, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 17/838,859

(22) Filed: Jun. 13, 2022

(65) Prior Publication Data
US 2023/0034137 A1    Feb. 2, 2023

(30) Foreign Application Priority Data

Jul. 28, 2021    (JP) .............................. JP2021-123605

(51) Int. Cl.
*F16J 1/08*    (2006.01)
*F16J 1/09*    (2006.01)
*F04B 39/02*    (2006.01)
*F16J 1/00*    (2006.01)

(52) U.S. Cl.
CPC .............. *F16J 1/08* (2013.01); *F04B 39/0292* (2013.01); *F16J 1/09* (2013.01); *F16J 1/005* (2013.01)

(58) Field of Classification Search
CPC ................... F16J 1/005; F16J 1/08; F16J 1/09
See application file for complete search history.

(56) References Cited

U.S. PATENT DOCUMENTS

| | | | | |
|---|---|---|---|---|
| 1,567,750 A | * | 12/1925 | Profitlich | F16J 1/005 277/412 |
| 2,295,521 A | * | 9/1942 | Payne | F16J 9/20 92/248 |
| 2,460,948 A | * | 2/1949 | Sander | F16J 1/005 92/258 |
| 4,556,223 A | * | 12/1985 | Van | F16J 15/166 277/584 |
| 5,076,150 A | * | 12/1991 | Wehber | F16J 9/00 92/255 |
| 2022/0120264 A1 | * | 4/2022 | Otsuka | F04B 39/06 |
| 2022/0196151 A1 | * | 6/2022 | Okada | F16J 9/061 |

FOREIGN PATENT DOCUMENTS

| | | | | |
|---|---|---|---|---|
| DK | 0979352 B1 | * | 10/2002 | F16J 9/00 |
| DK | 0851984 B1 | * | 8/2014 | F16J 9/08 |
| JP | 2001-032935 A | | 2/2001 | |
| JP | 2008-157076 A | | 7/2008 | |

* cited by examiner

*Primary Examiner* — Michael Leslie
(74) *Attorney, Agent, or Firm* — Studebaker & Brackett PC (57) ABSTRACT

In a piston including a plurality of piston rings, a state where a difference in differential pressure between the piston rings is eased is maintained even after passage of time, and the life of the piston rings is extended. A piston includes a piston body in which a plurality of ring grooves is formed, and a plurality of piston rings respectively arranged in the ring grooves. In the piston, a leakage groove is formed on a low-pressure side surface of the ring groove, and in a state where the piston ring is abutted with the low-pressure side surface while being abutted with a cylinder, the leakage groove ensures communication between a high-pressure side space and a low-pressure side space with respect to the piston ring.

4 Claims, 7 Drawing Sheets

PISTON AND RECIPROCATING COMPRESSOR

BACKGROUND OF THE INVENTION

Field of the Invention

The present invention relates to a piston and a reciprocating compressor.

Description of the Related Art

JP 2001-32935 A discloses a piston ring including a seal ring in which a joint is provided, and a backup ring arranged in contact with an inner periphery of the seal ring, the backup ring that evenly transmits a pressure of a gas to the seal ring. In the piston ring of JP 2001-32935 A, by locking the backup ring onto a projecting portion of the seal ring, an overlap of joints and anchoring of the rings to each other are prevented, so that a sealing property of the piston ring is improved. However, with this configuration, the sealing property of the piston ring is high. Thus, in a case of use in a high-pressure compressor, a large differential pressure is applied to some piston ring, and there is a possibility that the life of the piston ring is shortened.

Meanwhile, J P 2008-157076 A discloses a reciprocating compressor including piston rings formed to leak a gas out from joints. In JP 2008-157076 A, a size of joint clearances of the piston rings is adjusted to be smaller from the high-pressure side to the low-pressure side. That is, in this reciprocating compressor, by making a differential pressure applied to the piston rings more equal, progress of local abrasion of the piston rings is suppressed, and thereby, the life of the piston rings is to be extended.

In the reciprocating compressor of JP 2008-157076 A, the differential pressure is made to be equal by adjusting the size of the joint clearances of the piston rings. However, in this reciprocating compressor, abrasion of the piston rings progresses with passage of time by reciprocating motion of the piston. Thus, the size of the joint clearances may be changed to a size which is different from the set size. Therefore, a state where the differential pressure of the piston rings is adjusted is less easily maintained with passage of time, a large differential pressure is applied to some piston ring, and there is a possibility that the life of the piston ring is shortened.

SUMMARY OF THE INVENTION

An object of the present invention is, in a piston including a plurality of piston rings, to maintain a state where a difference in differential pressure between the plurality of piston rings is eased even after passage of time, and extend the life of the piston rings.

In order to achieve the object described above, the piston according to the present invention is a piston used for a reciprocating compressor having a cylinder, including a piston body in which a plurality of ring grooves is formed, and a plurality of piston rings respectively arranged in the plurality of ring grooves of the piston body. A leakage groove is formed on a low-pressure side surface of at least one of the plurality of ring grooves, and in a state where the piston ring corresponding to the leakage groove is abutted with the low-pressure side surface while being abutted with the cylinder, the leakage groove ensures communication between a space on the high-pressure side of the piston ring corresponding to the leakage groove and a space on the low-pressure side of the piston ring corresponding to the leakage groove.

With the piston formed in such a way, since a gas is leaked out from the space on the high-pressure side to the space on the low-pressure side through the leakage groove, it is possible to reduce a differential pressure applied to the piston rings. Therefore, in the plurality of piston rings to which differential pressures having different magnitudes are applied, a difference in differential pressure between the piston rings is eased. Thus, it is possible to suppress a large differential pressure from being applied to some piston ring. Since the leakage groove is arranged in the ring groove which is not easily influenced by sliding of the piston, it is possible to suppress temporal progress of abrasion of the leakage groove. Therefore, in the piston including the plurality of piston rings, it is possible to maintain a state where the difference in differential pressure between the plurality of piston rings is eased even after passage of time. Thus, it is possible to extend the life of the piston rings.

The piston body may include a piston shaft, a first piston member fitted onto the piston shaft, and a second piston member formed as a separate body from the first piston member and fitted onto the piston shaft. The first piston member may have the low-pressure side surface in which the leakage groove is formed, the second piston member may have a high-pressure side surface arranged to oppose the low-pressure side surface, and the ring grooves may be formed between the first piston member and the second piston member.

In this aspect, the first piston member and the second piston member are formed as separate bodies. Thus, before assembling the piston body, it is possible to establish a state where the leakage groove is more easily processed on the low-pressure side surface.

At least one leakage groove may be formed in each of at least two ring grooves among the plurality of ring grooves, and the number of the leakage grooves may be adjusted between the plurality of ring grooves.

In this aspect, since the number of the leakage grooves is adjusted between at least two ring grooves, it is possible to adjust a flow rate of the gas leaked out from the space on the high-pressure side to the space on the low-pressure side between the plurality of ring grooves. It is possible to increase the number of the leakage grooves for the piston ring having a large differential pressure, and decrease the number of the leakage grooves for the piston ring having a small differential pressure. Thereby, it is possible to more effectively ease the difference in differential pressure between the plurality of piston rings.

The leakage groove may be formed in each of at least two ring grooves among the plurality of ring grooves, and a flow passage area of the leakage grooves may be adjusted between the plurality of ring grooves.

In this aspect, since the flow passage area of the leakage grooves is adjusted between at least two ring grooves, it is possible to adjust a flow rate of the gas flowing from the space on the high-pressure side to the space on the low-pressure side between the plurality of ring grooves. Therefore, it is possible to increase the flow passage area for the piston ring having a large differential pressure, and decrease the flow passage area for the piston ring having a small differential pressure. Thereby, it is possible to more effectively ease the difference in differential pressure between the plurality of piston rings.

The piston may be provided in a reciprocating compressor including a cylinder that slidably houses the piston, and a crank mechanism.

According to the present invention, in the piston including the plurality of piston rings, it is possible to maintain a state where the difference in differential pressure between the plurality of piston rings is eased even after passage of time, and extend the life of the piston rings.

DESCRIPTION OF THE PREFERRED EMBODIMENTS

First Embodiment

Figure 1:
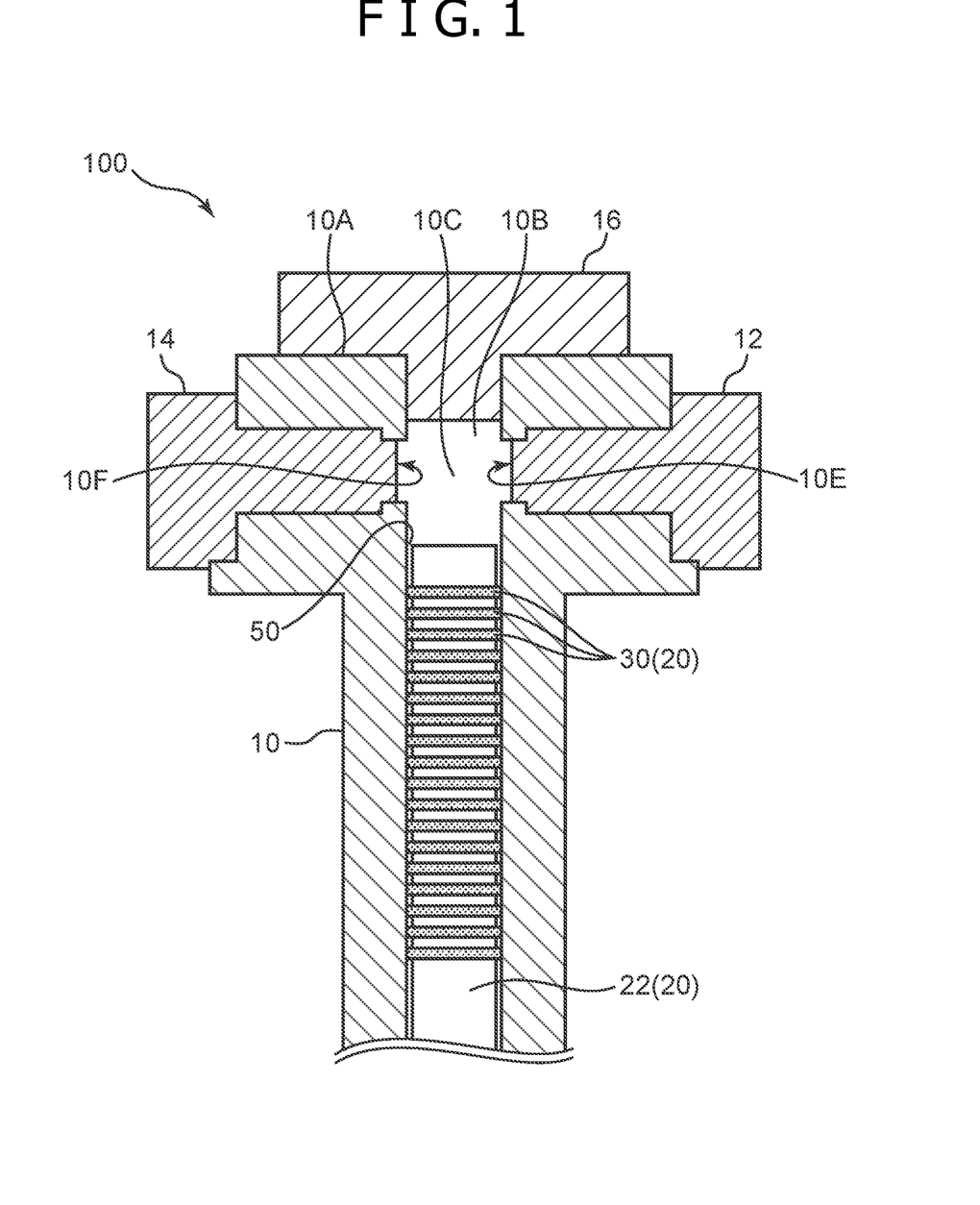
FIG. 1 is a sectional view schematically showing part of a reciprocating compressor according to a first embodiment.

FIG. 1 is a schematic sectional view showing some configuration of a reciprocating compressor according to a first embodiment (hereinafter, referred to as the "compressor 100"). In the following description, directional indicators such as "upper" and "lower" will be used. These directional indicators are intended only to clarify the description, and should not be interpreted in a limited manner.

As shown in FIG. 1, the compressor 100 includes a cylinder 10, a piston 20 arranged in the cylinder 10, a suction valve 12 and a discharge valve 14 respectively arranged on side surfaces of the cylinder 10, and a cylinder head 16 arranged on an upper surface 10A of the cylinder 10. The compressor 100 further includes a crank mechanism (not shown) arranged on the lower side of the cylinder 10, the crank mechanism that makes the piston 20 reciprocate in the up and down direction in the cylinder 10.

In the cylinder 10, a columnar internal space 10B extending in one direction and opening on the upper surface 10A of the cylinder 10 is formed, and an opening of the upper surface 10A is closed by the cylinder head 16. In the cylinder 10, a suction flow passage 10E extending to the side from the internal space 10B and opening on the side surface of the cylinder 10, and a discharge flow passage 10F extending to the opposite side to the above side from the internal space 10B, and opening on the opposite side surface to the suction flow passage 10E of the cylinder 10 are formed.

In the suction flow passage 10E, the suction valve 12 combined with the side surface of the cylinder 10 is provided. The suction valve 12 is a check valve that permits an inflow of a gas from an exterior to the internal space 10B, and is connected to a pipe (not shown) for supplying the gas from the exterior to the internal space 10B.

In the discharge flow passage 10F, the discharge valve 14 combined with the side surface of the cylinder 10 is provided. The discharge valve 14 is a check valve that permits an outflow of the gas from the internal space 10B to the exterior, and is connected to a pipe (not shown) for flowing the gas discharged from the internal space 10B.

The piston 20 is arranged in the internal space 10B coaxially to the cylinder 10, and has an axial length shorter than an axial length of the cylinder 10. In the internal space 10B of the cylinder 10, a part between the piston 20 and the cylinder head 16 functions as a compression chamber 10C. The suction flow passage 10E and the discharge flow passage 10F respectively communicate with the compression chamber 10C.

Figure 2:
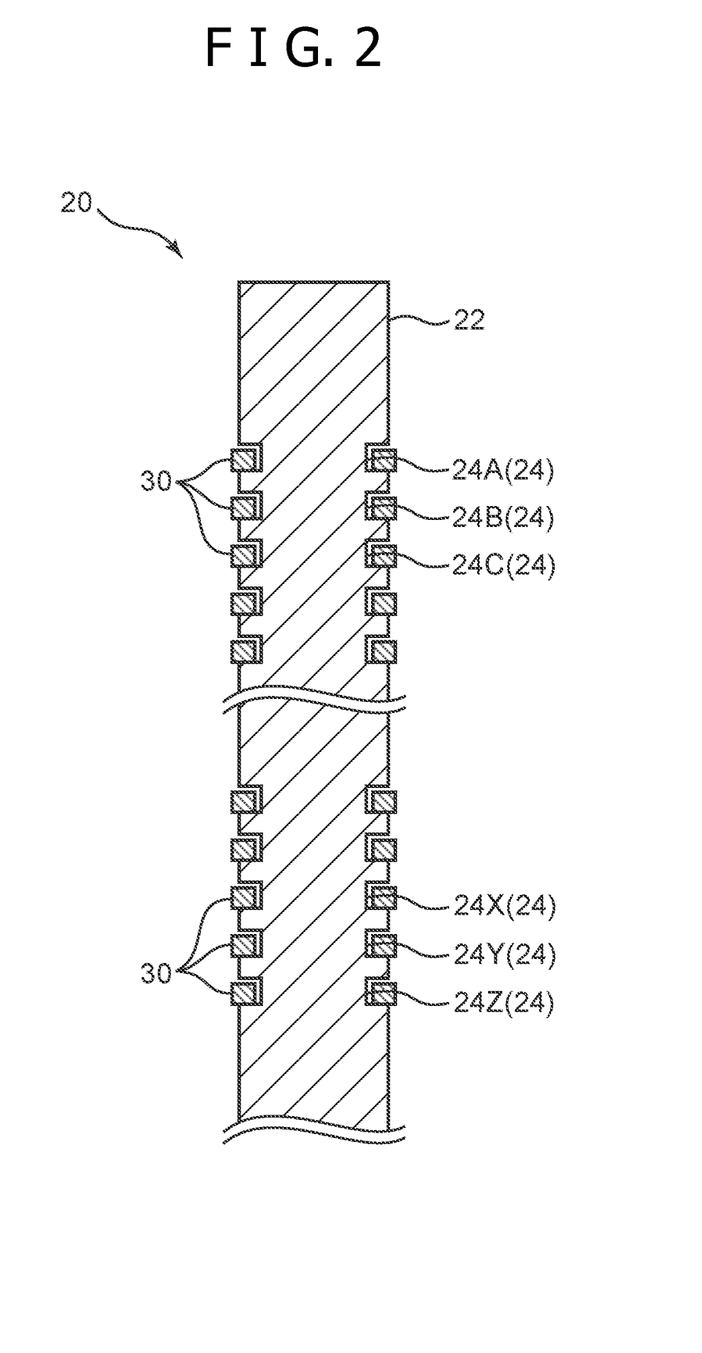
FIG. 2 is a sectional view schematically showing part of a piston according to the first embodiment.
Figure 3:
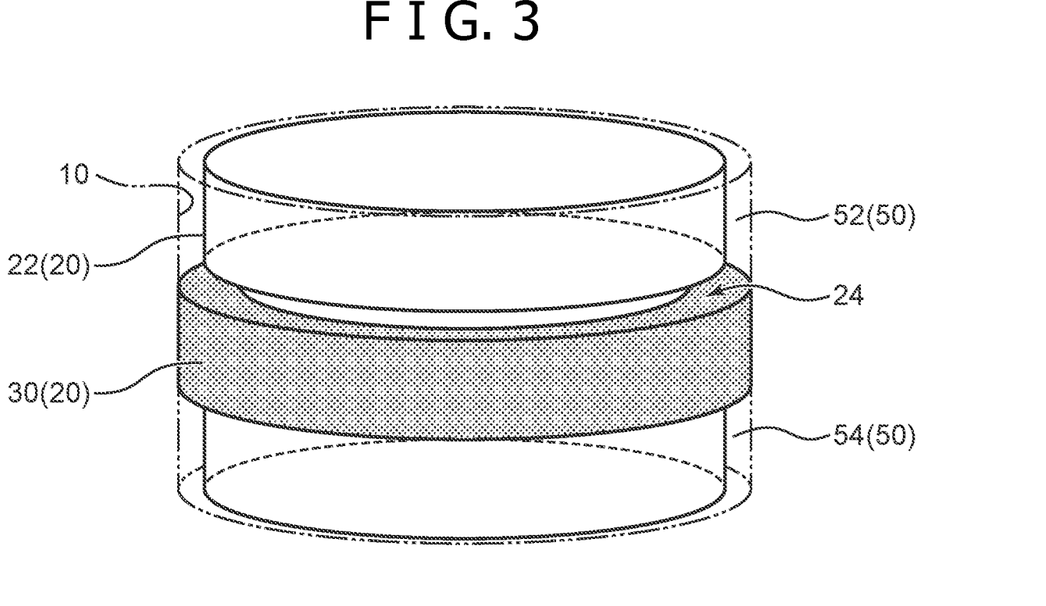
FIG. 3 is a configuration diagram schematically showing part of the piston according to the first embodiment.

As shown in FIGS. 2 and 3, the piston 20 includes a columnar piston body 22, and a plurality of piston rings 30 arranged on an outer peripheral surface of the piston body 22. An outer diameter of the piston body 22 is slightly smaller than a diameter of an inner peripheral surface of the cylinder 10. Therefore, a ring-shaped piston clearance 50 is formed between the outer peripheral surface of the piston body 22 and the inner peripheral surface of the cylinder 10. In FIGS. 1 and 3, the piston clearance 50 is expressed more exaggeratingly than reality.

On the outer peripheral surface of the piston body 22, a plurality of ring grooves 24 extending in the circumferential direction, the ring grooves being spaced from each other are formed. The piston ring 30 is arranged in each of the ring grooves 24. The plurality of piston rings 30 are seal members provided for suppressing leakage of the gas from the compression chamber 10C out to the crank mechanism side through the piston clearance 50. Each of the piston rings 30 is formed in a ring shape, and has a joint portion formed as if to cut the ring off.

The plurality of ring grooves 24 has ring grooves 24A, 24B, 24C . . . 24X, 24Y, 24Z arranged in order from the compression chamber 10C side. That is, the ring groove 24A is a ring groove arranged at the nearest position to the compression chamber 10C, and the ring groove 24Z is a ring groove arranged at the nearest position to the crank mechanism side.

Figure 4:
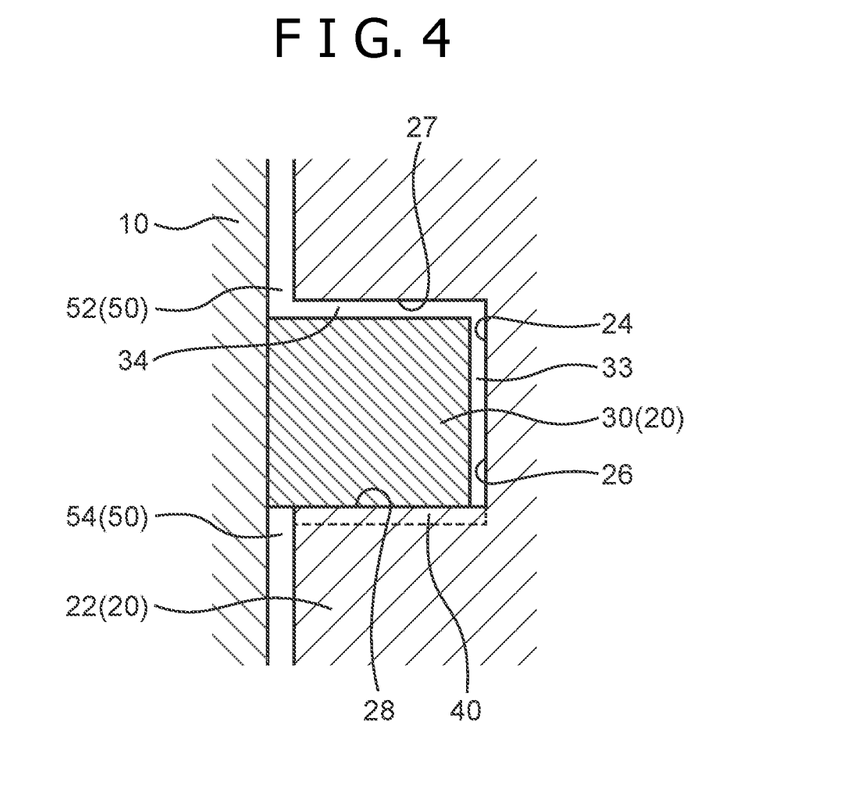
FIG. 4 is an enlarged view schematically showing a ring groove of a piston body according to the first embodiment.

As shown in an enlarged view of FIG. 4, each of the ring grooves 24 includes an inner bottom surface 26, a high-pressure side surface 27, and a low-pressure side surface 28. By the ring groove 24, a space having a rectangular section for arranging the piston ring 30 is formed.

The inner bottom surface 26 is formed on a columnar surface of the piston body 22, and opposes an inner peripheral surface of the piston ring 30. A diameter of the ring-shaped inner bottom surface 26 is smaller than the outer diameter of the piston body 22 and smaller than an inner diameter of the piston ring 30. Therefore, a bottom surface side clearance 33 is formed between the inner bottom surface 26 and the piston ring 30. A length of the inner bottom surface 26 in the axial direction of the piston 20 is slightly larger than a width of the piston ring 30 (length in the axial direction of the piston 20). Therefore, a side surface side clearance 34 communicating with the bottom surface side clearance 33 is formed between the high-pressure side surface 27 or the low-pressure side surface 28 and the piston ring 30.

The high-pressure side surface 27 is a ring-shaped side surface partitioning an end surface of the ring groove 24 on the compression chamber 10C side, connects an edge portion near the compression chamber 10C in the inner bottom surface 26 and the outer peripheral surface of the piston body 22, and faces the lower side (crank mechanism side). The high-pressure side surface 27 opposes a side surface of the piston ring 30 on the high-pressure side.

The low-pressure side surface 28 is a ring-shaped side surface partitioning an end surface of the ring groove 24 on the crank mechanism side, connects an edge portion near the crank mechanism in the inner bottom surface 26 and the outer peripheral surface of the piston body 22, and faces the upper side (compression chamber 10C side). The low-pressure side surface 28 opposes a side surface of the piston ring 30 on the low-pressure side.

In a state where the piston ring 30 is abutted with the low-pressure side surface 28 of the ring groove 24 while being abutted with the inner peripheral surface of the cylinder 10, the piston clearance 50 between the cylinder 10 and the piston 20 is partitioned into a high-pressure side space 52 and a low-pressure side space 54 by the piston ring 30. The high-pressure side space 52 is a space on the side nearer the compression chamber 10C than the piston ring 30. The low-pressure side space 54 is a space on the side nearer the crank mechanism than the piston ring 30.

Leakage grooves 40 extending from the inner bottom surface 26 to the outer peripheral surface of the piston body 22 are formed on the low-pressure side surface 28 of the ring groove 24. Inner ends of the leakage grooves 40 open to communicate with the bottom surface side clearance 33 in the ring groove 24, and outer ends open on the outer peripheral surface of the piston body 22. Therefore, in a state where the piston ring 30 is abutted with the low-pressure side surface 28, a flow passage providing communication between the high-pressure side space 52 and the low-pressure side space 54 is formed by the leakage grooves 40, the bottom surface side clearance 33, and the side surface side clearance 34.

Figure 5A:
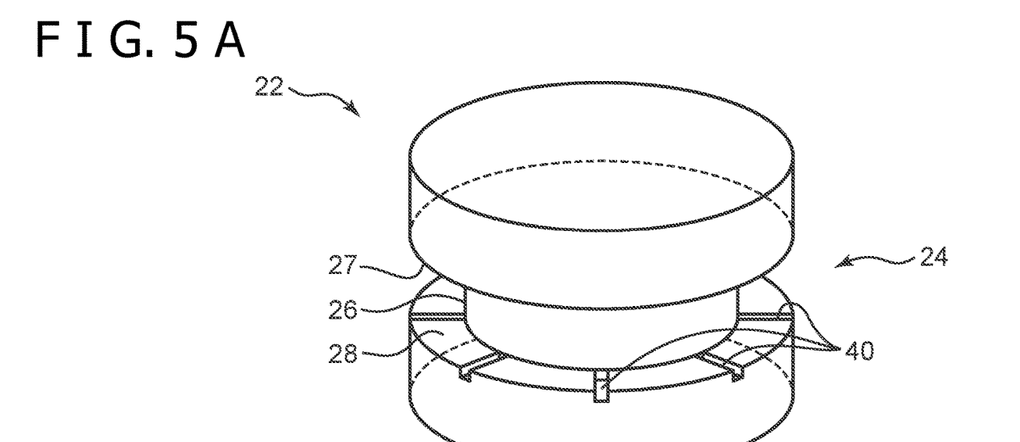
FIGS. 5A to 5C are configuration diagrams schematically showing the ring groove according to the first embodiment.
Figure 5B:
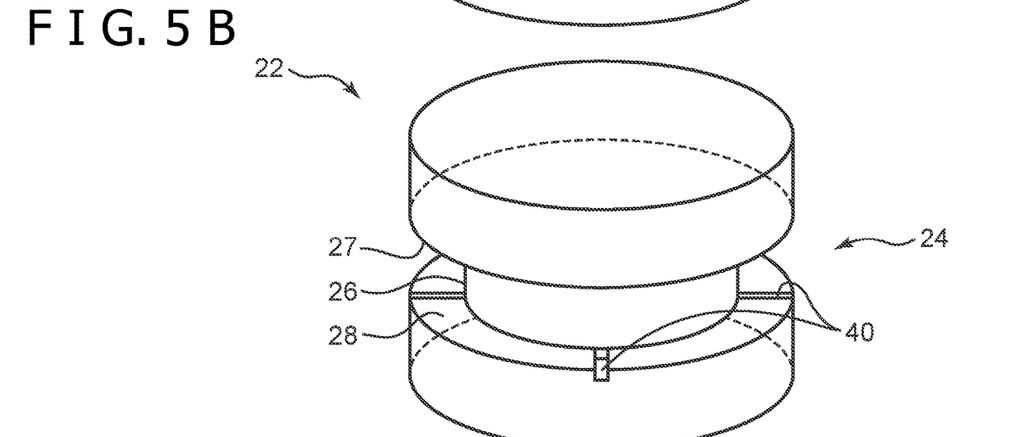
Figure 5C:
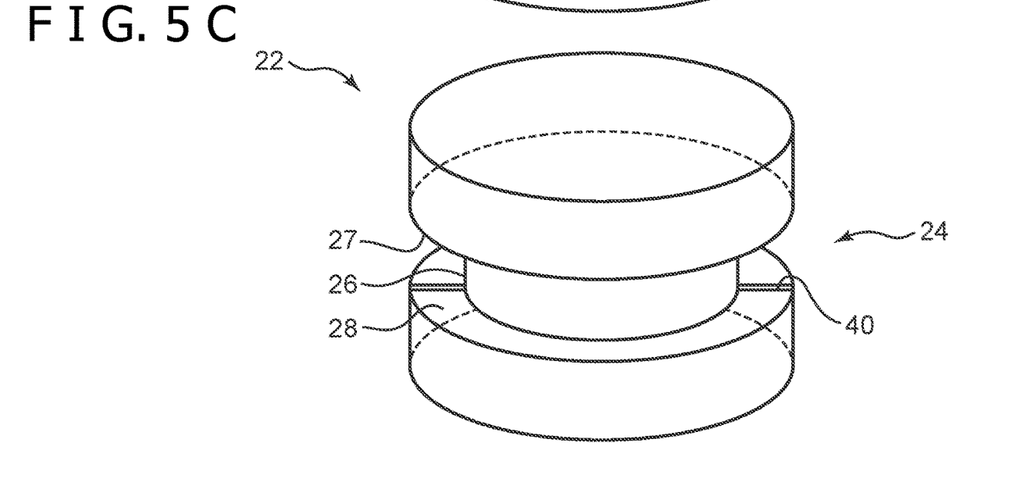

The leakage grooves 40 may be provided in each of the ring grooves 24 or may be provided in some ring grooves 24. For each of the ring grooves 24, the same number of leakage grooves 40 may be provided or the different number of leakage grooves 40 may be provided. For example, FIGS. 5A to 5C show examples in which eight, four, and two leakage grooves 40 are formed on the low-pressure side surface 28 of the ring groove 24. That is, between the plurality of ring grooves 24, the number of the leakage grooves 40 is adjusted. Thereby, between the plurality of ring grooves 24, a flow rate of the gas flowing from the high-pressure side space 52 to the low-pressure side space 54 is adjusted.

The number of the leakage grooves 40 provided on the low-pressure side surface 28 of the ring groove 24 is not limited to eight, four, and two. For example, on the low-pressure side surface 28, six, three, and one leakage grooves 40 may be provided or the other number of leakage grooves 40 may be provided. In a case where the plurality of leakage grooves 40 is provided on the low-pressure side surface 28, the plurality of leakage grooves 40 may be spaced from each other at equal intervals or may be spaced from each other at unequal intervals.

In each of the ring grooves 24, the number of the leakage grooves 40 is adjusted in accordance with a magnitude of differential pressure applied to the piston ring 30 which is arranged in the ring groove 24. For example, in the ring groove 24A of the piston ring 30 arranged at the nearest position to the compression chamber 10C where the differential pressure easily becomes large, the greatest number (such as eight) of the leakage grooves 40 are provided. The differential pressure of the piston ring 30 of the ring groove 24B adjacent to the low-pressure side of the ring groove 24A is smaller than the differential pressure of the piston ring 30 of the ring groove 24A. Thus, in the ring groove 24B, the same number as the ring groove 24A or less (such as four) of the leakage grooves 40 are provided. Further, the differential pressure of the piston ring 30 of the ring groove 24C adjacent to the low-pressure side of the ring groove 24B is smaller than the differential pressure of the piston ring 30 of the ring groove 24B. Thus, in the ring groove 24C, the same number as the ring groove 24B or less (such as two) of the leakage grooves 40 are provided. Alternatively, no leakage grooves 40 may be provided in the ring groove 24C.

Similarly, for example, in the ring groove 24Z of the piston ring 30 arranged at the nearest position to the crank mechanism where the differential pressure easily becomes large, the greatest number (such as eight) of the leakage grooves 40 are provided. The differential pressure of the piston ring 30 of the ring groove 24Y adjacent to the high-pressure side of the ring groove 24Z is smaller than the differential pressure of the piston ring 30 of the ring groove 24Z. Thus, in the ring groove 24Y, the same number as the ring groove 24Z or less (such as four) of the leakage grooves 40 are provided. Further, the differential pressure of the piston ring 30 of the ring groove 24X adjacent to the high-pressure side of the ring groove 24Y is smaller than the differential pressure of the piston ring 30 of the ring groove 24Y Thus, in the ring groove 24X, the same number as the ring groove 24Y or less (such as two) of the leakage grooves 40 are provided. Alternatively, no leakage grooves 40 may be provided in the ring groove 24X.

(Operating Actions, Operations, and Effects)

At the time of operating the compressor 100, the piston 20 follows reciprocating motion of the crank mechanism and slides in the cylinder 10, and the compression chamber 10C repeats compression and expansion. Following the compression and the expansion of the compression chamber 10C, the gas is suctioned from the exterior to the compression chamber 10C via the suction valve 12, and the gas whose pressure is boosted is discharged from the compression chamber 10C to the exterior via the discharge valve 14.

Part of the gas whose pressure is boosted in the compression chamber 10C flows into the piston clearance 50 between the cylinder 10 and the piston 20. This gas passes through in the ring groove 24 and is leaked out to the crank mechanism side. At this time, the differential pressure is applied to each of the piston rings 30. In the piston ring 30, this differential pressure is due to a difference in pressure between the high-pressure side space 52 and the low-pressure side space 54 of the piston ring 30. By this differential pressure, the piston ring 30 is brought into a state where the piston ring 30 is abutted with the low-pressure side surface 28 of the ring groove 24 while being abutted with the inner peripheral surface of the cylinder 10.

In the compressor 100, by dispersing the pressure of the gas leaked out from the compression chamber 10C to the crank mechanism side to the plurality of piston rings 30, a large differential pressure is not applied to each of the piston rings 30. This dispersed differential pressure is not equal over the piston rings 30 but a difference is generated between the piston rings 30. That is, a relatively large differential pressure may be applied to some piston ring 30. In that case, abrasion of the piston ring 30 to which a relatively large differential pressure is applied may easily progress.

However, in the present embodiment, the leakage grooves 40 are provided in the ring groove 24, and the gas is leaked from the high-pressure side space 52 to the low-pressure side space 54 through the leakage grooves 40. Thus, the differential pressure applied to the piston rings 30 is reduced. Therefore, even in a case where a difference is generated in the differential pressure between the piston rings 30, by reducing the differential pressure of the piston ring 30 by the leakage grooves 40 for the ring groove 24 of the piston ring 30 where the differential pressure is large, it is possible to ease the difference in differential pressure between the piston rings 30. Therefore, it is possible to suppress a large differential pressure from being applied to some piston ring 30.

Further, since the leakage grooves 40 are formed on the low-pressure side surface 28 of the ring groove 24, abrasion and deformation due to sliding of the piston 20 are not easily generated. Therefore, in the compressor 100, it is possible to maintain a state where the difference in differential pressure between the piston rings 30 is eased even after passage of time. Thus, it is possible to extend the life of the plurality of piston rings 30.

Furthermore, since the number of the leakage grooves 40 is adjusted between the plurality of ring grooves 24, it is possible to reduce the differential pressure applied to the piston rings 30 in accordance with the number of the leakage grooves 40. That is, by increasing the number of the leakage grooves 40 for the piston ring 30 to which a large differential pressure is applied, and decreasing the number of the leakage grooves 40 for the piston ring 30 to which a small differential pressure is applied, it is possible to more effectively ease the difference in differential pressure between the piston rings 30.

Second Embodiment

Figure 6A:
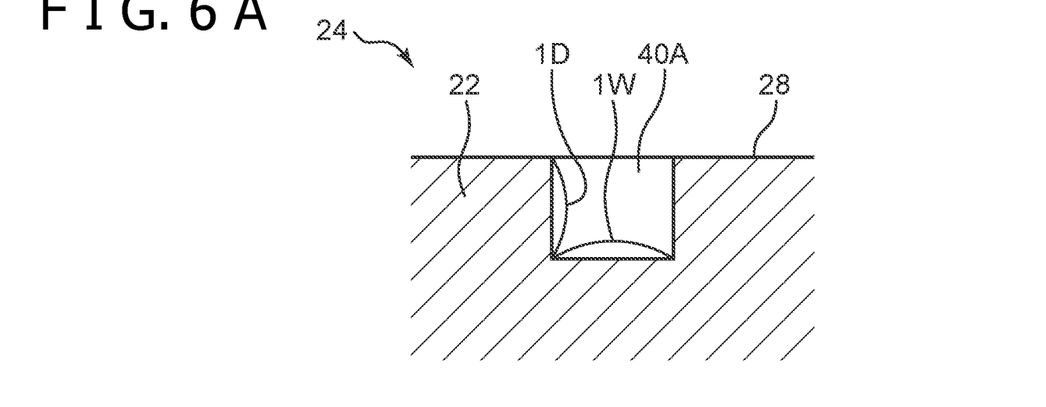
FIGS. 6A to 6C are sectional views schematically showing a leakage groove according to a second embodiment.
Figure 6B:
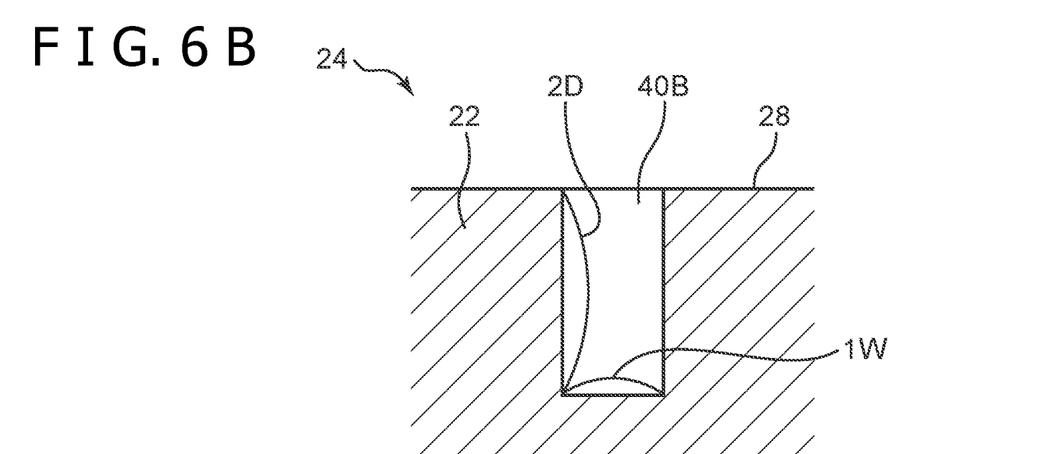
Figure 6C:
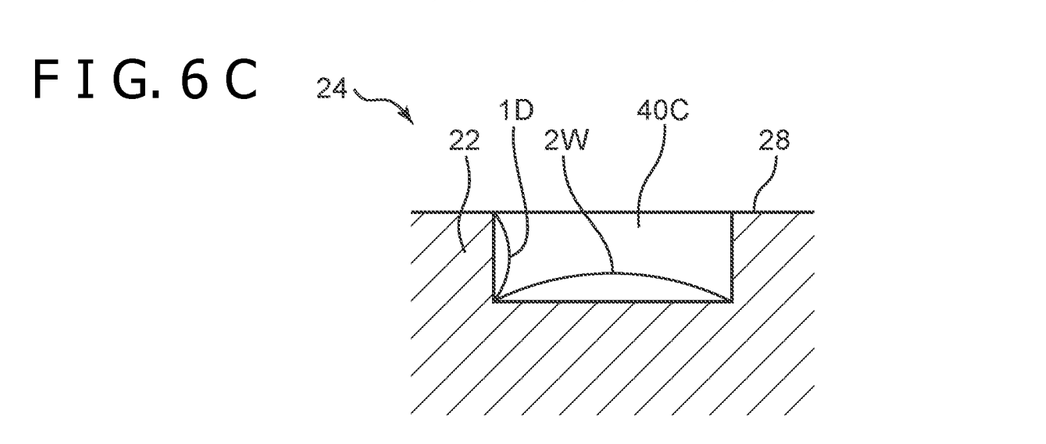

A compressor 100 of a second embodiment is different from the compressor 100 of the first embodiment in a point that a flow passage area of the leakage grooves 40 is adjusted as shown in FIGS. 6A to 6C.

For example, FIGS. 6A to 6C show examples of leakage grooves 40 whose flow passage areas are different by having different groove depths or groove widths. A groove depth of a leakage groove 40B of FIG. 6B is a groove depth 2D larger than a groove depth 1D of a leakage groove 40A of FIG. 6A, and a flow passage area of the leakage groove 40B is larger than a flow passage area of the leakage groove 40A. A groove width of a leakage groove 40C of FIG. 6C is a groove width 2W larger than a groove width 1W of the leakage groove 40A of FIG. 6A, and a flow passage area of the leakage groove 40C is larger than the flow passage area of the leakage groove 40A.

In the compressor 100 formed in such a way, since the flow passage area of the leakage grooves 40 is adjusted between the plurality of ring grooves 24, it is possible to reduce a differential pressure applied to piston rings 30 in accordance with the flow passage area. That is, by increasing the flow passage area of the leakage grooves 40 for the piston ring 30 to which a large differential pressure is applied, and decreasing the flow passage area of the leakage grooves 40 for the piston ring 30 to which a small differential pressure is applied, it is possible to more effectively ease a difference in differential pressure between the piston rings 30.

Third Embodiment

A compressor 100 of a third embodiment is different from the compressor 100 of the first embodiment in a point that a piston body 22 can be broken down.

Figure 7:
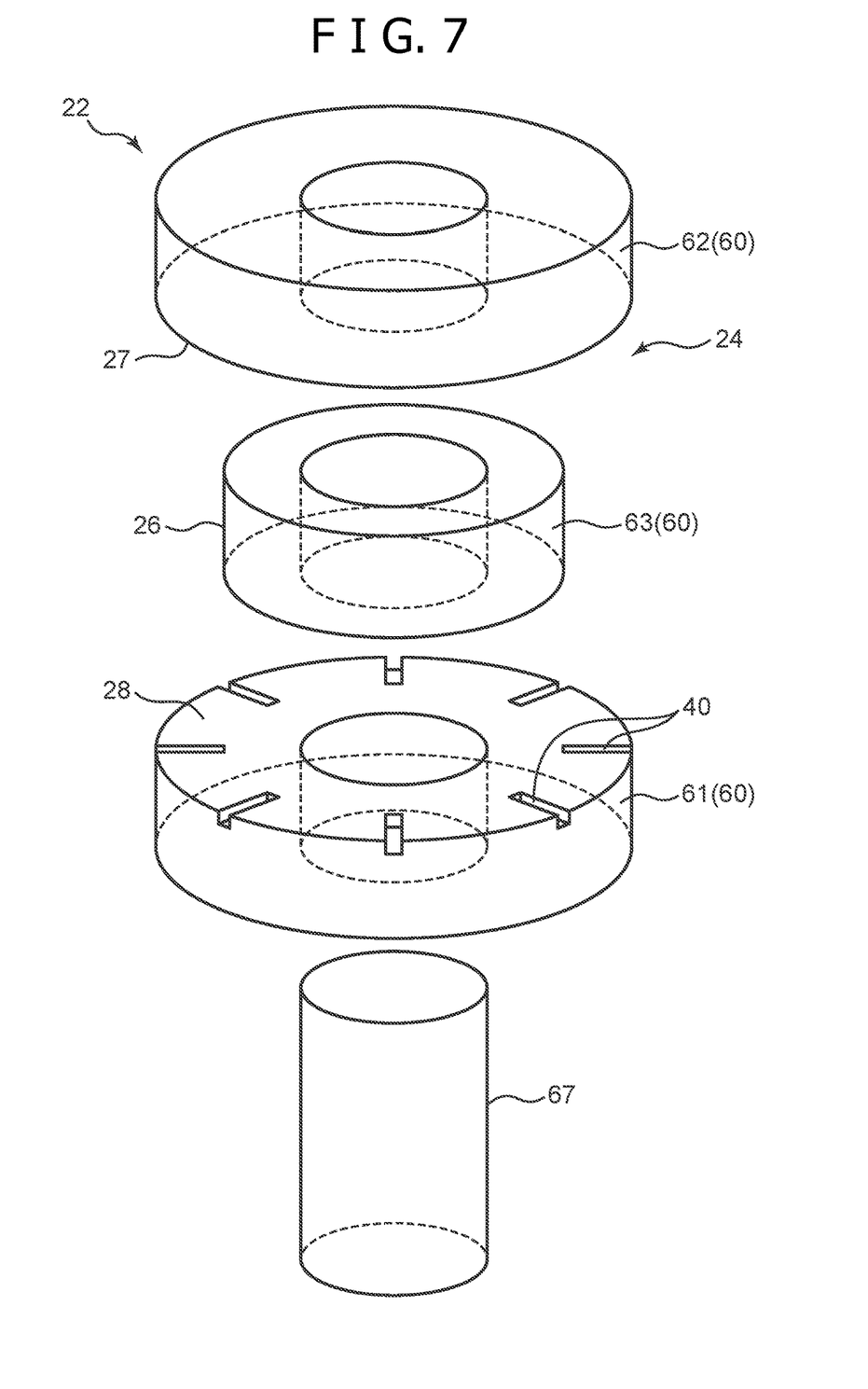
FIG. 7 is a configuration diagram schematically showing part of a piston body according to a third embodiment.

As shown in FIG. 7, the piston body 22 includes a columnar piston shaft 67 extending in one direction, and a plurality of piston members 60 fitted onto the piston shaft 67. As shown in FIG. 7, the plurality of piston members 60 includes a first piston member 61, a second piston member 62, and an intermediate piston member 63 respectively formed as separate bodies.

The first piston member 61, the second piston member 62, and the intermediate piston member 63 are parts forming one ring groove 24. The piston body 22 has the large number of first piston members 61, second piston members 62, and intermediate piston members 63.

The intermediate piston member 63 is arranged between the first piston member 61 and the second piston member 62. An outer diameter of the first piston member 61 is equal to an outer diameter of the second piston member 62. An outer diameter of the intermediate piston member 63 is smaller than the outer diameter of the first piston member 61 and smaller than an inner diameter of a piston ring 30.

The ring groove 24 is formed by fitting the first piston member 61, the second piston member 62, and the intermediate piston member 63 onto the piston shaft 67. That is, the ring groove 24 is formed between the first piston member 61 and the second piston member 62. At this time, an upper surface of the first piston member 61 functions as a low-pressure side surface 28 of the ring groove 24, a lower surface of the second piston member 62 functions as a high-pressure side surface 27 of the ring groove 24, and an outer peripheral surface of the intermediate piston member 63 functions as an inner bottom surface 26 of the ring groove 24. Leakage grooves 40 are formed on the upper surface of the first piston member 61 functioning as the low-pressure side surface 28.

In the compressor 100 formed in such a way, it is possible to process the leakage grooves 40 in the first piston member 61 having a surface which functions as the low-pressure side surface 28 in a state where the piston body 22 is broken down to the first piston member 61, the second piston member 62, and the intermediate piston member 63. Thus, it is possible to more easily process the leakage grooves 40.

Figure 8:
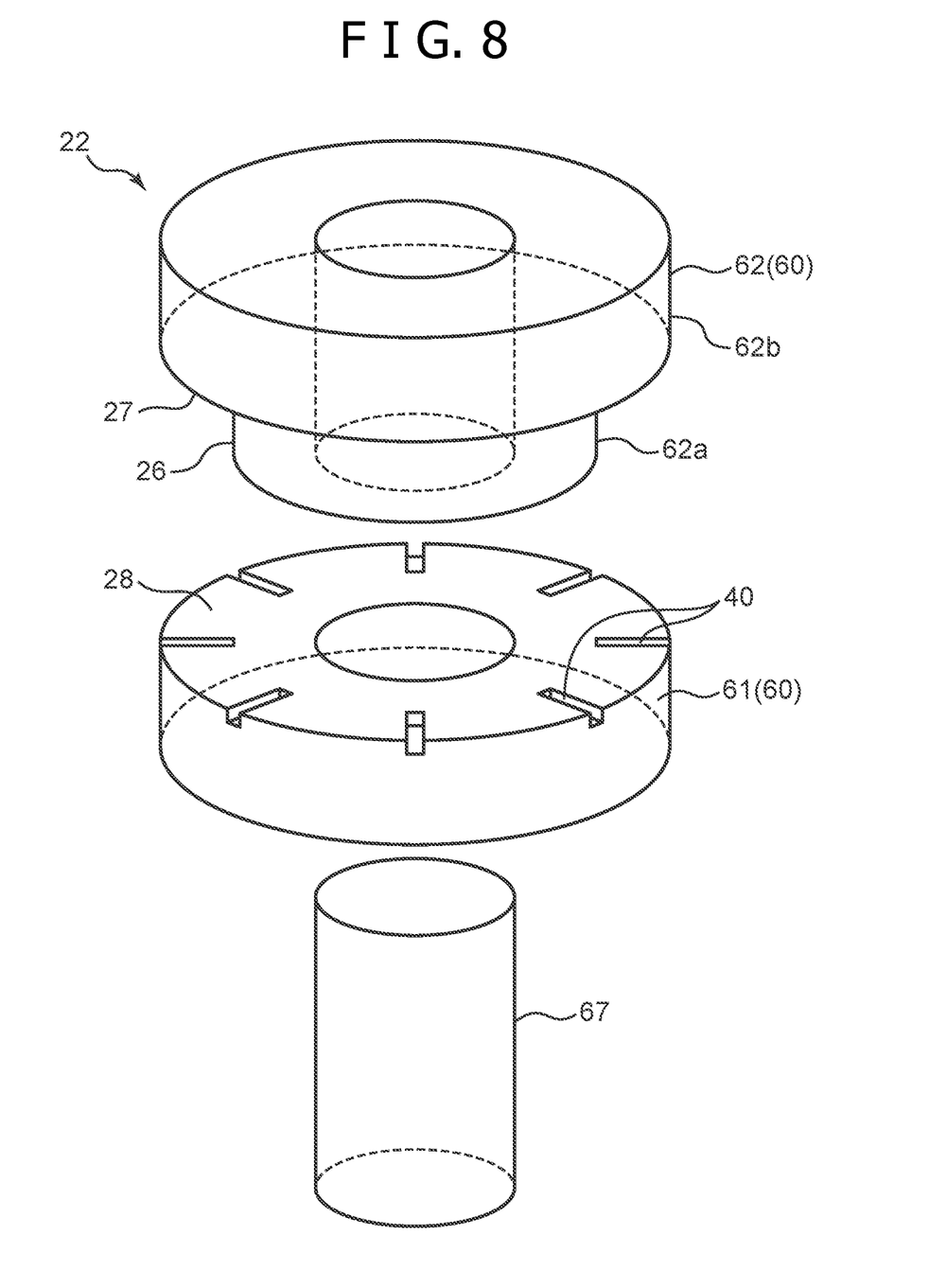
FIG. 8 is a configuration diagram schematically showing part of the piston body according to the third embodiment.

In the third embodiment, the piston body 22 corresponding to the ring grooves 24 can be broken down to the three piston members 61 to 63. However, the present invention is not limited to this. For example, as shown in FIG. 8, a part of a piston body 22 corresponding to one ring groove 24 may be broken down to a first piston member 61 and a second piston member 62 whose outer peripheral surface is formed stepwise.

In this case, the second piston member 62 includes a columnar first part 62a having an outer diameter smaller than an outer diameter of the first piston member 61 and smaller than an inner diameter of a piston ring 30, and a columnar second part 62b adjacent to the first part 62a in the axial direction of a piston 20, the second part having an outer diameter of the same magnitude as the first piston member 61.

A columnar-surface-shaped outer peripheral surface of the first part 62a functions as an inner bottom surface 26 of the ring groove 24. The second part 62b has a downward surface connecting an upper end edge of the first part 62a and a lower end edge of the second part 62b and functioning as a high-pressure side surface 27 of the ring groove 24.

The second piston member 62 is fitted onto the piston shaft 67 in a state where a lower surface of the first part 62a is abutted with an upper surface of the first piston member 61. Thereby, the ring groove 24 is formed between the first piston member 61 and the second piston member 62.

Although description of the other configurations, operations, and effects is omitted, the description of the first embodiment and the second embodiment can be incorporated in the third embodiment.

The embodiments disclosed herein should be understood as non-restrictive but examples in every respect. The scope of the present invention is shown not by the description above but by the claims, and all changes within the meanings and the ranges equal to the claims are intended to be included.

The technology described in relation to the above embodiments is favorably utilized in various technological fields which require compression of a gas.

What is claimed is:

1. A piston used for a reciprocating compressor having a cylinder, comprising:
    a piston body in which a plurality of ring grooves is formed; and
    a plurality of piston rings respectively arranged in the plurality of ring grooves of the piston body,
    wherein a leakage groove is formed on a low-pressure side surface of at least one of the plurality of ring grooves,
    in a state where the piston ring corresponding to the leakage groove is abutted with the low-pressure side surface while being abutted with the cylinder, the leakage groove ensures communication between a space on the high-pressure side of the piston ring corresponding to the leakage groove and a space on the low-pressure side of the piston ring corresponding to the leakage groove,
    wherein at least one leakage groove is formed in each of at least two ring grooves among the plurality of ring grooves, and
    the at least two ring grooves include a first ring groove and a second ring groove, wherein the first ring groove has a different number of leakage grooves than the second ring groove.

2. The piston according to claim 1, wherein the piston body includes:
    a piston shaft;
    a first piston member fitted onto the piston shaft; and
    a second piston member formed as a separate body from the first piston member and fitted onto the piston shaft,
    wherein the first piston member has the low-pressure side surface in which the leakage groove is formed,
    the second piston member has a high-pressure side surface arranged to oppose the low-pressure side surface, and
    the ring groove is formed between the first piston member and the second piston member.

3. A piston used for a reciprocating compressor having a cylinder, comprising:
    a piston body in which a plurality of ring grooves is formed; and
    a plurality of piston rings respectively arranged in the plurality of ring grooves of the piston body,
    wherein a leakage groove is formed on a low-pressure side surface of at least one of the plurality of ring grooves,
    in a state where the piston ring corresponding to the leakage groove is abutted with the low-pressure side surface while being abutted with the cylinder, the leakage groove ensures communication between a space on the high-pressure side of the piston ring corresponding to the leakage groove and a space on the low-pressure side of the piston ring corresponding to the leakage groove,
    wherein the leakage groove is formed in each of at least two ring grooves among the plurality of ring grooves, and
    the at least two ring grooves include a first ring groove and a second ring groove, wherein the first ring groove has a flow passage area different than the second ring groove.

4. A reciprocating compressor comprising:
the piston according to claim 1; and
a cylinder into which the piston is inserted.

* * * * *